Patented Oct. 10, 1939

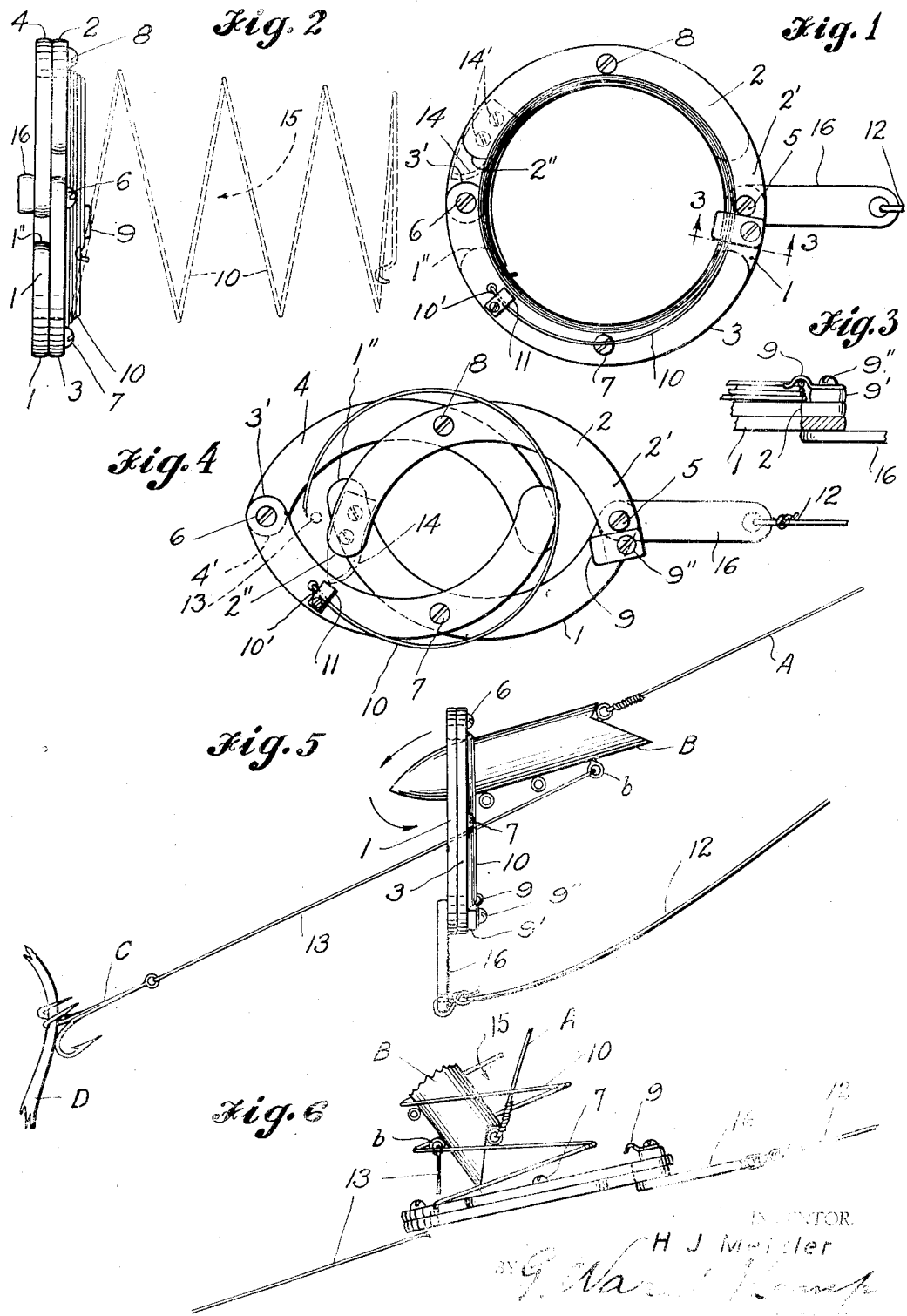
Oct. 10, 1939. H. J. METZLER 2,175,757
DEVICE FOR RAISING FISH PLUGS
Filed Sept. 21, 1938

2,175,757

UNITED STATES PATENT OFFICE 2,175,757

DEVICE FOR RAISING FISH PLUGS

Henry John Metzler, Seattle, Wash.

Application September 21, 1938, Serial No. 230,959

3 Claims. (Cl. 43—30)

This invention relates to fishing appliances, and particularly to devices for severing plugs or lures from fishing hooks when snagged, and also for connecting an auxiliary line to a plug.

In the use of lures or plugs when trolling for fish, especially for salmon in deep waters, the hooks carried beneath said plugs frequently become attached or snagged upon sunken logs, seaweed and other fixed obstructions, too far beneath the surface to be reelased. In such cases the fisherman must pull upon his line until it breaks, and such breaking frequently occurs above the plug, thereby resulting in the loss of the plug, which is generally of considerable value. On some other occasions, unusually large fish such as sharks and halibut become attached to the hooks, and are too heavy to be raised by the ordinary trolling line used.

Objects of this invention, are therefore, to provide a device for severing plugs from above the hooks on occasions when the hooks have become attached to fixed obstructions, and on other occasions to carry and attach an auxiliary line beneath the plug for raising fish too large to be raised by the ordinary trolling line.

A particular object, is to provide, a plurality of fingers each one substantially semicircular in form, and all pivotally connected together to form a ring when assembled and so adapted to slide down over a trolling line and over a plug thereon; together with a resilient arm attached to one of the fingers, and projected backward therefrom, to a latch for normally retaining the fingers in such ring formation. It is also an object to provide a line to extend from such latch for releasing the same from such arm when the ring has passed beneath the plug, whereby the operator may so release the arm and cause the fingers to close beneath the plug for raising the same.

With these and other objects to be hereinafter stated, I have illustratively exemplified my invention by the accompanying drawing, of which:

Figure 1 shows a top plan of the device assembled.

Figure 2 is a rear end view of the ring and shows a coil spring dotted in for a cage.

Figure 3 is a fragmentary detail view taken on line 3—3 of Fig. 1.

Figure 4 is a plan view of the ring partially collapsed, and the fingers partially extended.

Figure 5 is a semidiagrammatic view showing the ring in possible position when passing over the plug; and Figure 6 shows a side view of the ring collapsed and fingers closed beneath the plug, with parts of the plug and cage broken away.

Like figures on the different characters represent like parts.

Numerals 1, 2, 3 and 4, represent flattened fingers each in arc form of slightly less than a semicircle and preferably of noncorrosive material. The rear end 1' of No. 1 and No. 2 at a point 2' near the rear end thereof are connected together by a pivot pin 5; and the front ends 3' and 4' of 3 and 4 are connected together by a pivot 6. Fingers 1 and 4 are positioned on the lower level and on the same plane with each other and fingers 2 and 3 are on the same plane with each other above, and the two pair are assembled one over the other in slidable relation. Fingers 1 and 3 are connected together by a pivot pin 7 at a point approximately central thereof but somewhat further from the pivoted ends 1' and 3' thereof. The fingers 2 and 4 are connected together by a pivot pin 8 at a point approximately central along the same but somewhat further from the pivoted ends 2' and 4' thereof. By such location of the pivots 7 and 8, the shorter ends of the fingers beyond said last named pivots are enabled to pass inside of the ends connected by pivots 5 and 6 when the latter are drawn away from each other. The rear end of finger 2, is continued slightly beyond the pin 5, and mounted thereupon is a hook or latch preferably spaced above by a block 9'. A resilient arm 10 is attached at its lower forward tip 10' to the finger 3 by a clamp 11 or any suitable means.

Normally the four fingers are assembled in folded relation and so complete a ring as seen in Fig. 1. In this position the arm 10, is bent under the latch 9, and normally maintains the ring formation with the points 1" and 2" folded under and over the fingers 3 and 4 respectively. As thus shaped the ring is positioned over the top of a trolling line A, and readily slides down such line and over a fish plug B, near the lower end of the line. The ring may be so used on occasions when the hooks C, suspended from beneath the plug, have become snagged or attached to any fixed obstruction as indicated by D. In order to sever and save the plug from such snagged hook, a heavier line 12 is first connected from the pivot 5 by any suitable means as a strap 16, before the ring has been sent down the trolling line.

In operation when the ring has descended beneath the plug a fisherman pulls upon the line 12 which draws the connected ends 3' and 4' against the hook line 13 below the plug and also against the lower side of said plug, next the arm or coil 10 is pulled away from the latch and the ring collapses and the two fingers 3 and 4 are drawn backward and the tips or points 1" and 2" of fingers 1 and 2 are drawn inward toward each other thereby approximately closing the space around said line 13 as the same extends between such tips and the rear ends of 3 and 4 and so prevents the plug from repassing below the fingers. Sufficient power on the line 12 then breaks the hook line 13 and frees the plug therefrom.

In some instances it is preferable to attach a short cutting blade 14 to the tips of one of the fingers as 2" indicated in Fig. 4. When the fingers 1 and 2 close toward each other this blade is drawn inward and contacts with the line 13 and facilitates the severing thereof. In cases where an unusually heavy fish cannot be raised by the trolling line the blade is removed and the fingers 1 and 2 when closed beneath the block enable the fisherman to raise such heavy fish by means of the line 12 connected below the plug and fingers, said fingers having been closed by the pulling of the fish on the line 12.

In practice it is preferable to use the lower circuit of a helical spring as part of the arm 10 and to extend the coils of the spring upward sufficiently to provide a cage 15 as indicated in Figs. 2 and 6, for retaining the plug when severed so that the ring and plug may be then raised together. When such expanded coils are provided and are all compressed or folded upon each other the one side of the folds is positioned beneath the said latch. When the ring and coils have passed beneath the plug and the line 12 is pulled the coils are drawn from the latch and expand upward and enclose the plug above the finger. While I have described my invention in certain terms and drawings I do not limit my invention to the specific form so described but desire to protect my invention within the scope of the claims appended.

Having described my invention I claim as new:

1. A device for raising fishing plugs when attached to fixed objects and unusually large fish, comprising, a plurality of metal fingers of substantially semicircular form, said fingers pivotally connected together in pairs, and adapted to be folded together in double planes one above the other to form a ring for sliding down a trolling line and beneath a fish plug near the lower end thereof, a latch affixed to the rear end of one of said fingers, and a coil spring affixed by its lower end to another one of said fingers, and adapted to be folded at one side thereof beneath said latch, for normally maintaining said fingers in such ring formation and for holding such coil in compressed formation over said fingers, said spring being further adapted to expand above said fingers to provide a cage for said plug when released from said fixed object, and an auxiliary line for lifting said ring and plug connected from said latch at the rear end of said ring formation and adapted to separate said latch from said spring, when tension is placed on said last named line, two of said fingers pivotally connected at their rear ends, and connected near the center thereof to two adjacent fingers, and the front ends of the first two fingers last mentioned adapted to close toward each other when said spring is released and to bar said plug from repassing below said ring and fingers, and to facilitate the raising of heavy fishes on said hook, and to facilitate the separation of said plug from the hooks beneath the same, when attached to a fixed obstruction.

2. An adjustable ring for raising fish plugs, comprising, four fingers each substantially semicircular in shape and the first pair of the fingers pivotally connected together in planes one above the other at their front ends, and the second pair of fingers pivotally connected in planes one above the other at their rear ends, each separate finger of said first pair pivotally connected to a separate finger of a second pair at point approximately central to each but slightly nearer the front ends of said second pair of fingers to facilitate the front ends of said rear fingers to close inward toward each other when said ring is collapsed, a resilient arm attached at its forward end to one of said front fingers and the body of said arm extended backward and over the rear end of said rear fingers, a latch attached to one of said rear fingers and adapted to normally bind over said arm and to maintain said fingers assembled in ring formation for sliding on a fish line and plug thereon, and a line connected from said latch for withdrawing the same from said arm and for collapsing said ring when beneath said plug and for closing the front ends of said rear fingers beneath said plug for severing and raising the same.

3. A device for raising fishing plugs, including a plurality of fingers, each approximately semicircular in form and all pivotally connected together, an arm attached on one of said fingers, a latch attached to another one of said fingers for normally retaining said arm and for normally maintaining said fingers in assembled ring formation adapted for sliding over a trolling line and plug thereon, and means for releasing said latch from said arm and collapsing said ring and closing fingers thereof beneath said plug and for raising the same.

HENRY JOHN METZLER.